US012587863B2

(12) United States Patent
Arai et al.

(10) Patent No.: US 12,587,863 B2
(45) Date of Patent: Mar. 24, 2026

(54) CONTROL METHOD AND WIRELESS COMMUNICATION SYSTEM

(71) Applicant: NTT, Inc., Tokyo (JP)

(72) Inventors: Takuto Arai, Musashino (JP); Daisei Uchida, Musashino (JP); Tatsuhiko Iwakuni, Musashino (JP); Shuki Wai, Musashino (JP)

(73) Assignee: NTT, Inc., Tokyo (JP)

( * ) Notice: Subject to any disclaimer, the term of this patent is extended or adjusted under 35 U.S.C. 154(b) by 321 days.

(21) Appl. No.: 18/561,219

(22) PCT Filed: May 17, 2021

(86) PCT No.: PCT/JP2021/018587
§ 371 (c)(1),
(2) Date: Nov. 15, 2023

(87) PCT Pub. No.: WO2022/244048
PCT Pub. Date: Nov. 24, 2022

(65) Prior Publication Data
US 2024/0259817 A1 Aug. 1, 2024

(51) Int. Cl.
*H04W 16/08* (2009.01)
*H04B 7/0413* (2017.01)

(52) U.S. Cl.
CPC .......... *H04W 16/08* (2013.01); *H04B 7/0413* (2013.01)

(58) Field of Classification Search
CPC ............................. H04W 16/08; H04B 7/0413
See application file for complete search history.

(56) References Cited

U.S. PATENT DOCUMENTS

2005/0239473 A1 10/2005 Pan et al.
2016/0029205 A1 1/2016 Sirotkin
2021/0336750 A1* 10/2021 Zhou ..................... H04W 76/28

FOREIGN PATENT DOCUMENTS

JP 2005333625 A 12/2005
JP 2017-163285 A 9/2017
JP 2017-526235 A 9/2017

OTHER PUBLICATIONS

White Paper 5G Sophistication and 6G, Jul. 2020 (Version 2.0), NTT Docomo, Inc.

(Continued)

*Primary Examiner* — Curtis B Odom
(74) *Attorney, Agent, or Firm* — Harness, Dickey & Pierce, P.L.C.

(57) ABSTRACT

One aspect of the present invention is a control method in a wireless communication system including a plurality of distributed antennas that perform wireless communication with a user terminal, and a plurality of signal processing units that are connected to the plurality of distributed antennas and perform signal processing, the control method including: a setting unit that sets reference information for leveling loads of the plurality of signal processing units for each of the plurality of signal processing units; an acquisition step of acquiring load information indicating a load of a signal processing unit; and an assignment step of assigning the signal processing unit as a connection destination of the distributed antenna on the basis of the load information acquired in the acquisition step and the reference information, and leveling the loads of the plurality of signal processing units.

8 Claims, 9 Drawing Sheets

(56) References Cited

OTHER PUBLICATIONS

Kota Ito et al., "A novel centralized beamforming scheme for radio-over-fiber systems with fixed wavelength allocation", IEICE Communications Express, vol. 8, No. 12, 584-589, 2019.

* cited by examiner

Figure 6:
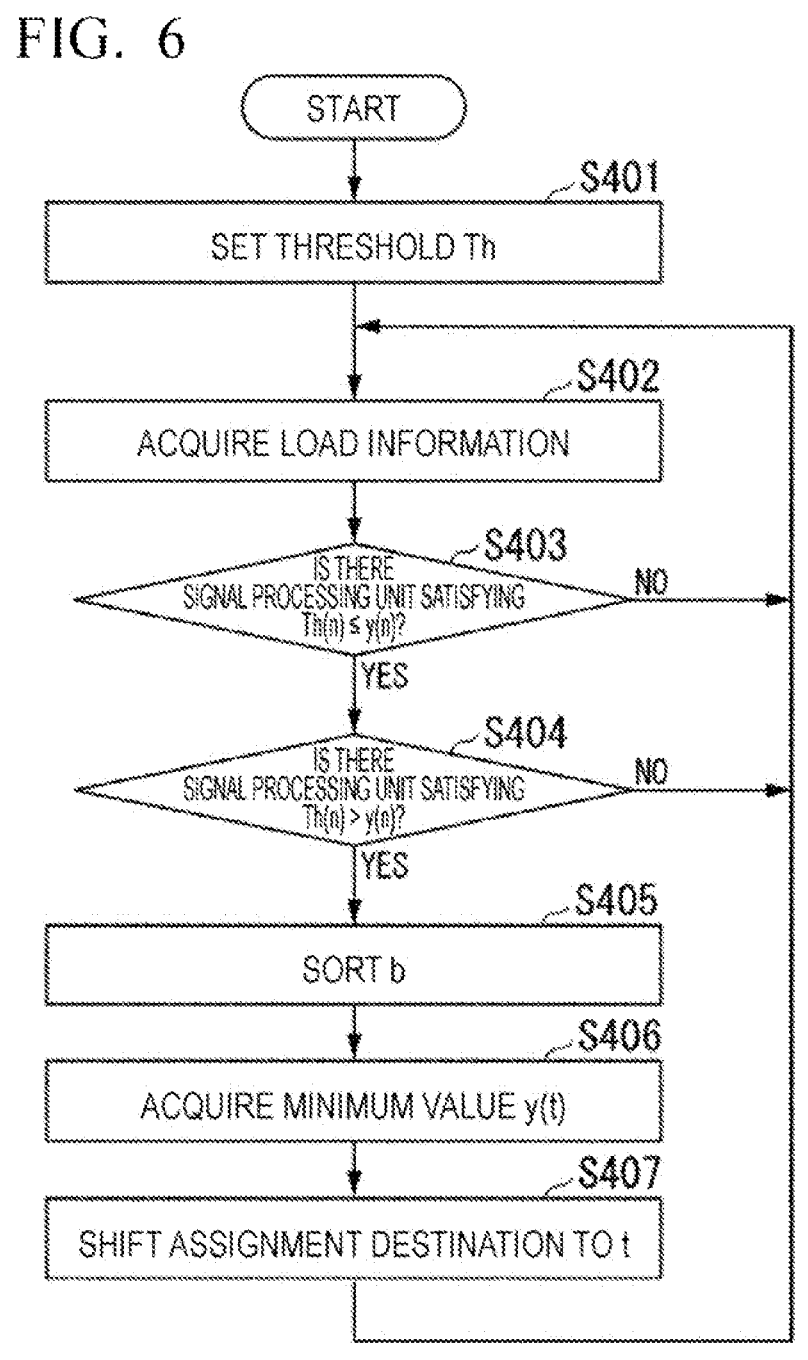

START

S401
SET THRESHOLD Th

S402
ACQUIRE LOAD INFORMATION

S403
IS THERE SIGNAL PROCESSING UNIT SATISFYING Th(n) ≤ y(n)?  —— NO

YES

S404
IS THERE SIGNAL PROCESSING UNIT SATISFYING Th(n) > y(n)?  —— NO

YES

S405
SORT b

S406
ACQUIRE MINIMUM VALUE y(t)

S407
SHIFT ASSIGNMENT DESTINATION TO t

CONTROL METHOD AND WIRELESS COMMUNICATION SYSTEM

CROSS-REFERENCE TO RELATED APPLICATIONS

This application is a 371 U.S. National Phase of International Application No. PCT/JP2021/018587, filed on May 17, 2021. The entire disclosure of the above application is incorporated herein by reference.

TECHNICAL FIELD

The present invention relates to a technology of a control method and a wireless communication system.

BACKGROUND ART

In the fifth generation mobile communication system (5G), a high frequency band of a millimeter wave band is used, and use of a further higher frequency band capable of securing a wider bandwidth is assumed in order to achieve further increase in speed and capacity in a future wireless system such as the 6G.

A high frequency band is known to have a large propagation loss and high straightness, and a distributed antenna system has been studied in order to improve connectivity in covering a communication area (see Non Patent Literature 1).

FIG. 8 illustrates an example of a general base station configuration. The base station configuration in FIG. 8 includes a base band unit (BBU) in which processing of a layer higher than a physical layer is performed, a remote radio head (RRH) that may include RF processing and a part of the physical layer, and an antenna. The UE indicates a user terminal. The antenna may be extended from or integrated with the RRH.

FIG. 9 illustrates an example of a base station configuration of a distributed antenna system. The base configuration in FIG. 9 includes a BBU, an RRH, and an antenna as in FIG. 8. In the base station configuration of FIG. 9, a plurality of antennas are extended from the RRH, and the same cell is covered by the plurality of antennas. As a result, in the base station configuration of FIG. 9, the communication area can be expanded. Further, by performing multiple input and multiple output (MIMO) in cooperation of a plurality of antennas, an increase in communication capacity can also be expected.

CITATION LIST

Non Patent Literature

Non Patent Literature 1: NTT DOCOMO, INC., "DOCOMO 6G White Paper 2.0 version", July 2020
Non Patent Literature 2: K. Ito, M. Suga, Y. Shirato, N. Kita, and T. Onizawa, "A novel centralized beamforming scheme for radio-over-fiber systems with fixed wavelength allocation", IEICE Communications Express, Vol. 8, No. 12. pp. 584-589, 2019.

SUMMARY OF INVENTION

Technical Problem

In the case of the base station configuration as illustrated in FIGS. 8 and 9 as described above, the antenna and the cell resource are fixedly associated with each other. Therefore, in the base station configuration as illustrated in FIGS. 8 and 9, it is not possible to follow the temporal variation of the load, for example, distribution of the traffic amount and the number of connected users is biased depending on the cell. As a result, there is a high probability of causing a decrease in throughput, cell resource shortage or surplus, or the like.

In the existing technology, resource control across a plurality of areas in one cell resource can be performed by copying and distributing one cell resource to a plurality of antennas in the base station configuration as illustrated in FIG. 9, but resource control across a plurality of cell resources cannot be performed.

In view of the above circumstances, an object of the present invention is to provide a technology capable of achieving a control method and a wireless communication system capable of following a variation of a load.

Solution to Problem

One aspect of the present invention is a control method in a wireless communication system including a plurality of distributed antennas that perform wireless communication with a user terminal, and a plurality of signal processing units that are connected to the plurality of distributed antennas and perform signal processing, the control method including: a setting unit that sets reference information for leveling loads of the plurality of signal processing units for each of the plurality of signal processing units; an acquisition step of acquiring load information indicating a load of a signal processing unit; and an assignment step of assigning the signal processing unit as a connection destination of the distributed antenna on the basis of the load information acquired in the acquisition step and the reference information set in the setting step, and leveling the loads of the plurality of signal processing units.

One aspect of the present invention is a wireless communication system including a plurality of distributed antennas that perform wireless communication with a user terminal, and a plurality of signal processing units that are connected to the plurality of distributed antennas and perform signal processing, the wireless communication system further including: a setting unit (hereinafter also referred to as "setter") that sets reference information for leveling loads of the plurality of signal processing units for each of the plurality of signal processing units; an acquisition unit (hereinafter also referred to as "acquirer") that acquires load information indicating a load of a signal processing unit; and an assignment unit (hereinafter also referred to as "assignor") that assigns the signal processing unit as a connection destination of the distributed antenna on the basis of the load information acquired by the acquisition unit and the reference information set by the setting unit, and leveling the loads of the plurality of signal processing units.

Advantageous Effects of Invention

According to the present invention, it is possible to achieve a control method and a wireless communication system capable of following a variation of a load.

BRIEF DESCRIPTION OF DRAWINGS

FIG. 2 is a block diagram illustrating a configuration or the like of a CS 100.

FIG. 6 is a flowchart illustrating a flow of processing of the CS 100.

DESCRIPTION OF EMBODIMENTS

Embodiments of the present invention will be described in detail with reference to the drawings.

Figure 1:
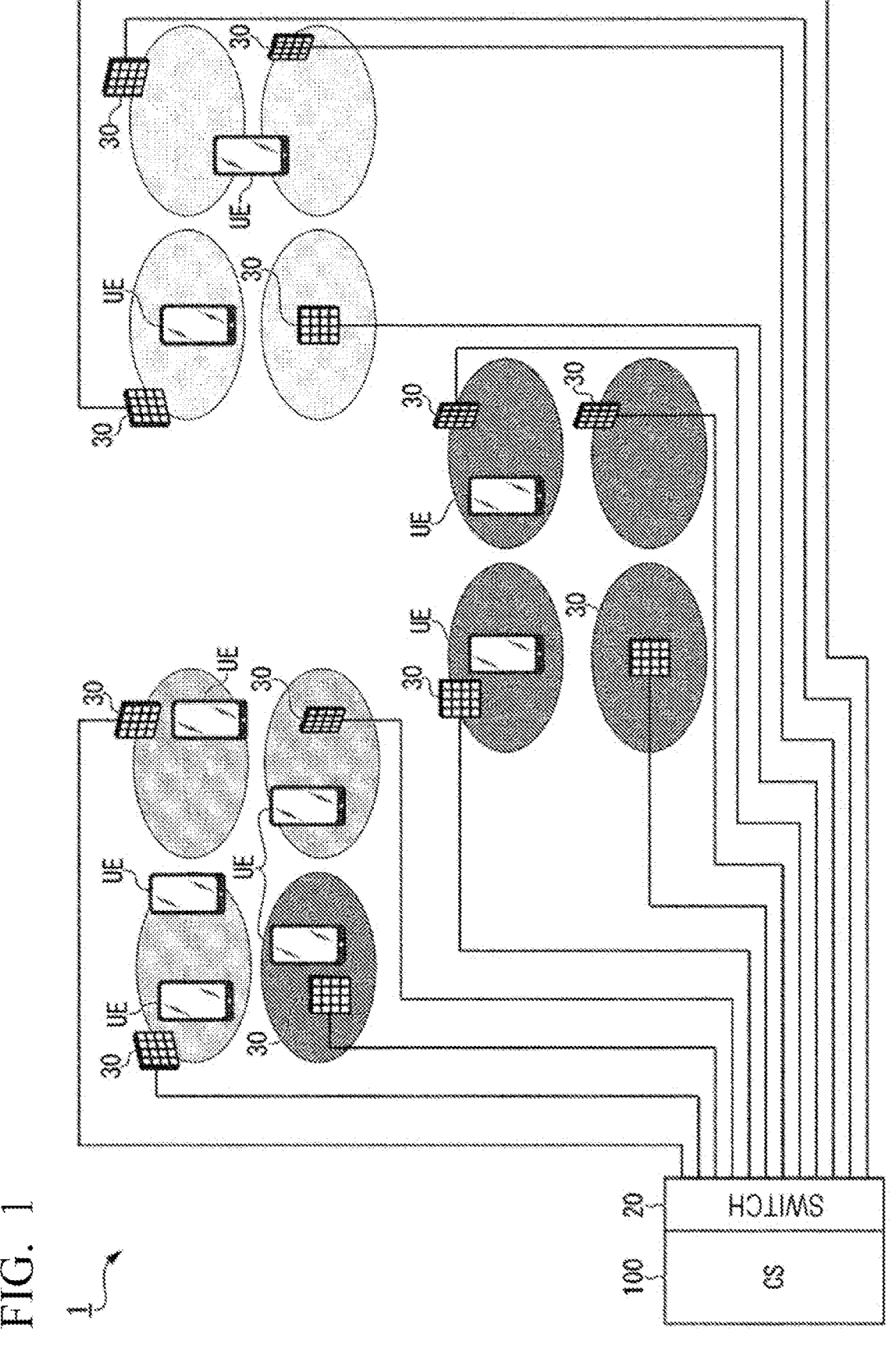
FIG. 1 is a block diagram illustrating a configuration of a wireless communication system 1.

FIG. 1 is a block diagram illustrating a configuration of a wireless communication system 1 in an embodiment. The wireless communication system 1 includes a central station (CS) 100, a switch 20, and a distributed antenna 30. The UE indicates a user terminal.

The wireless communication system 1 uses an analog radio over fiber (RoF) technology. Specifically, waveform information of an analog signal is transmitted from the CS 100 to an extended station provided with the distributed antenna 30 via an optical fiber. As a result, by integrating the signal processing functions into the CS 100, the extended station only requires to have functions such as the distributed antenna 30, an amplifier, E/O conversion, and O/E conversion, so that downsizing and power saving of the extended station can be achieved.

The CS 100 communicates with the distributed antenna 30 via the switch 20. The CS 100 performs remote beam control corresponding to a beamforming technology only by an aggregation station. The switch 20 is connected to the distributed antenna 30 and the CS 100. The switch 20 dynamically assigns the distributed antenna 30 to the plurality of signal processing units provided in the CS 100 under the control of the CS 100.

Figure 2:
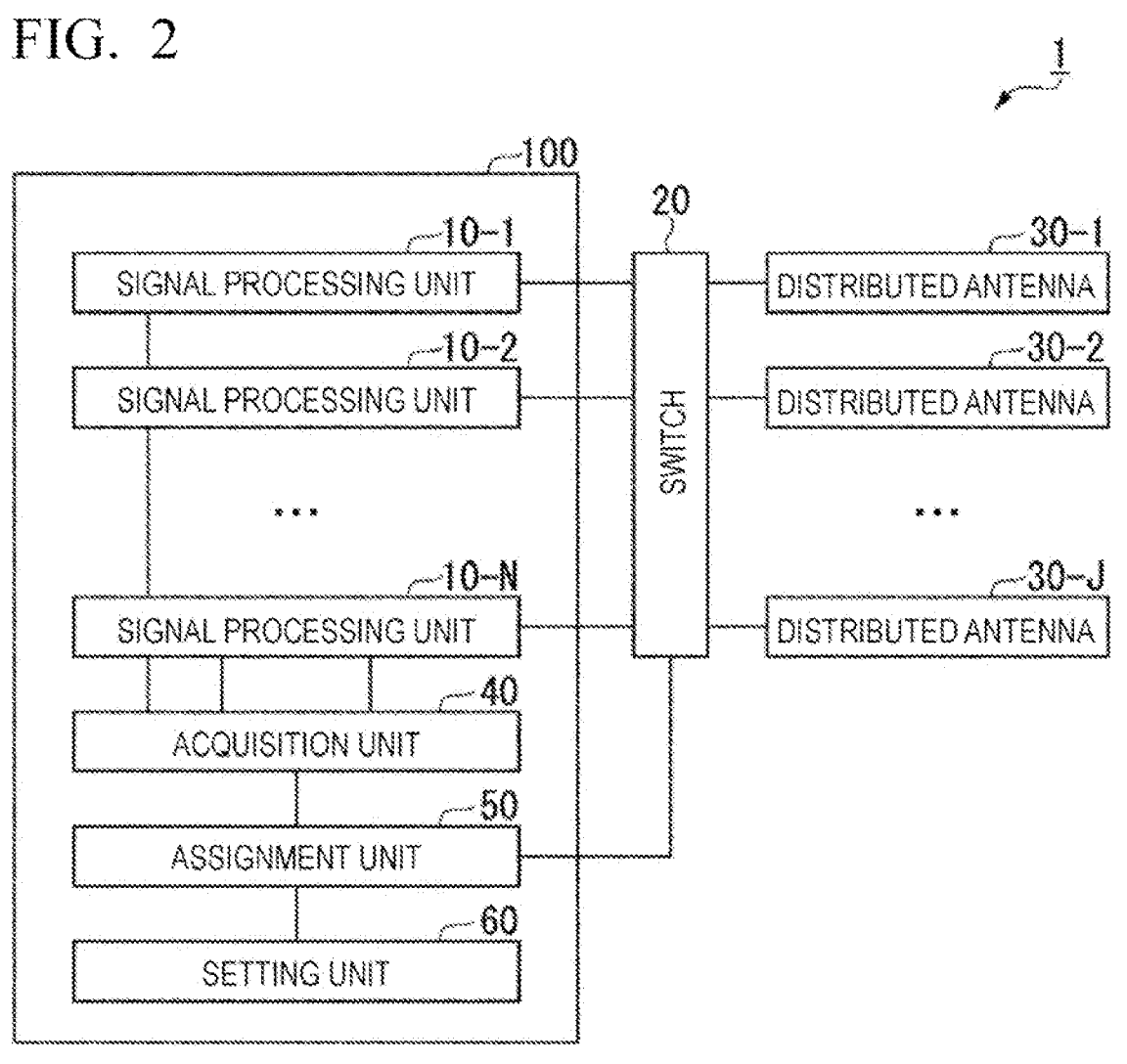

FIG. 2 is a block diagram illustrating a configuration or the like of the CS 100. The CS 100 includes N (N is an integer of 2 or more) signal processing units 10-1, 10-2, . . . , and 10-N, an acquisition unit 40, an assignment unit 50, and a setting unit 60. Each of the signal processing units 10-1, 10-2, . . . , and 10-N is expressed as a signal processing unit 10 unless otherwise distinguished. In the configuration of FIG. 2, J (J is an integer of 2 or more) distributed antennas 30-1, 30-2, . . . , and 30-J are provided. Each of the distributed antennas 30-1, 30-2, . . . , and 30-J is expressed as a distributed antenna 30 unless otherwise distinguished.

The signal processing unit 10 performs various types of processing on a signal received from a host device (not illustrated) and outputs the processed signal to the distributed antenna 30. The signal processing unit 10 performs various types of processing on the signal received from the distributed antenna 30 and outputs the processed signal to the host device.

Several distributed antennas 30 are assigns to the signal processing unit 10. The signal processing unit 10 performs processing related to a signal to be transmitted and received to and from the assigned distributed antenna. The distributed antenna 30 assigned to each signal processing unit 10 can be changed by using the switch 20 under the control of the assignment unit 50.

The acquisition unit. 40 acquires load information indicating the load of the signal processing unit 10 for each signal processing unit 10. In the present embodiment, the load information is information indicating the number of connected user terminals that perform wireless communication with the distributed antenna, the user throughput in the user terminal, the number of traffic buffers in the signal processing unit 10, the calling failure rate in the signal processing unit 10, the packet loss rate in the signal processing unit 10, or the traffic amount in the signal processing unit 10, but is not limited thereto.

The setting unit 60 sets, for each signal processing unit 10, reference information for leveling the load of the signal processing unit 10 for each signal processing unit 10. The reference information indicates a reference value for comparison with the load indicated by the load information. The assignment unit 50 can refer to the set reference information. In the present embodiment, the reference value indicated by the reference information includes a target value and a threshold. The target value is set for the number of connected user terminals, the user throughput, the number of traffic buffers, or the calling failure rate. The threshold is set for the packet loss rate or the traffic amount. These are examples, and the target value or the threshold may be used as long as the value indicates the load.

The assignment unit 50 assigns the signal processing unit 10 of the connection destination of the distributed antenna 30 on the basis of the load information and the reference information, and levels the loads of the plurality of signal processing units 10. The assignment unit 50 assigns the signal processing unit 10 of the connection destination of the distributed antenna 30 by using the switch 20 that switches the connection destination of the distributed antenna 30.

The assignment unit 50 perform dynamic assignment to each signal processing unit 10 in units of the distributed antenna 30 on the basis of the load information in each signal processing unit 10. When the reassignment is performed, the load of the signal processing unit 10 is leveled by taking over the assigned distributed antenna 30 and the user to be connected to the distributed antenna 30, to the newly assigned signal processing unit 10.

Next, a flow of processing of the CS 100 will be described using four flowcharts. Two of the four flowcharts use a target value as a reference, and the remaining two use a threshold as a reference. First, two flowcharts using target values will be described.

Figure 3:
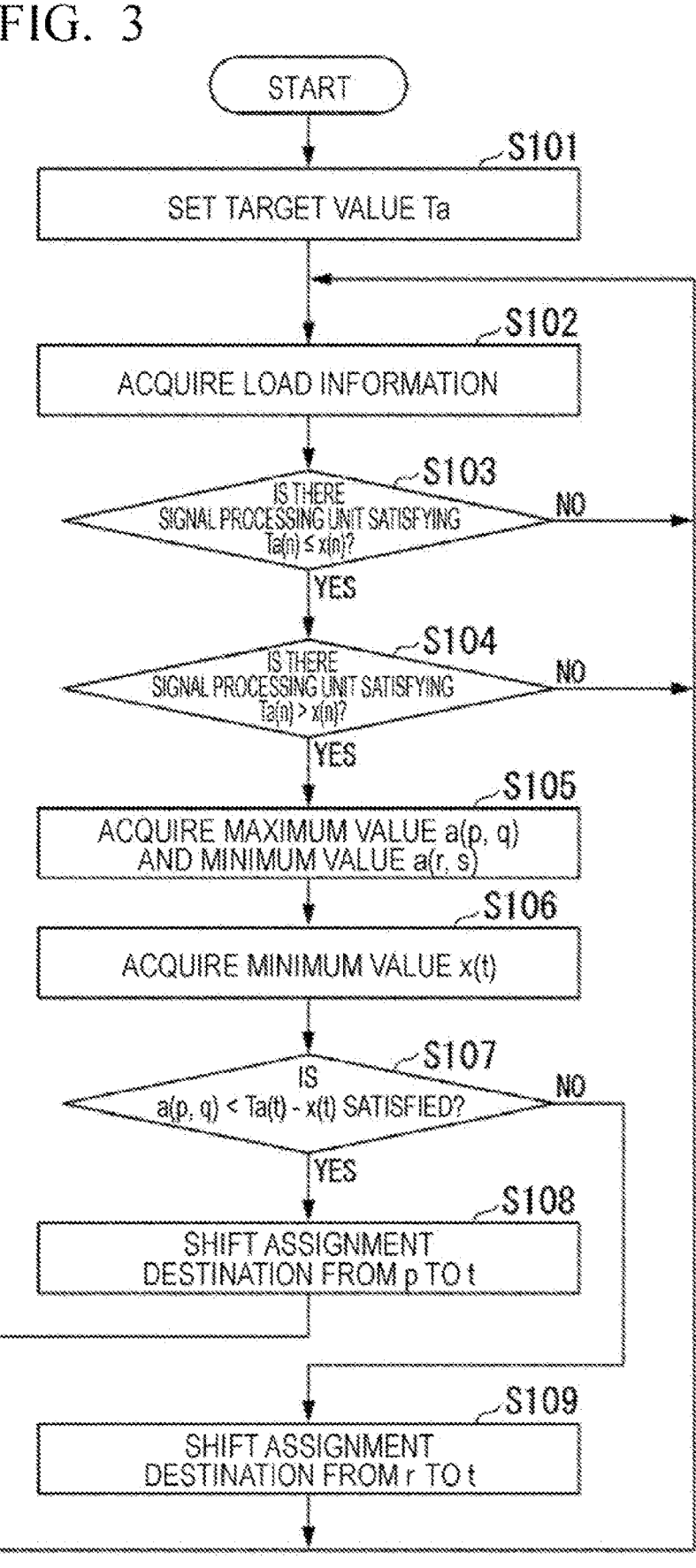
FIG. 3 is a flowchart illustrating a flow of processing of the CS 100.

FIG. 3 is a flowchart illustrating a flow of processing of the CS 100. The flowchart illustrated in FIG. 3 is a first flowchart in a case where a target value is used as a reference.

In FIG. 3, the setting unit 60 sets a target value Ta for each signal processing unit 10 (step S101). A target value of a signal processing unit 10-$n$ ($n$=1 to N) is set to Ta($n$).

The acquisition unit 40 acquires the above-described load information from each signal processing unit 10 (step S102). The acquired load information is output to the assignment unit 50.

The load indicated by the load information acquired from the signal processing unit 10-$n$ is x($n$). x($n$) is a sum of loads in the distributed antenna 30 connected to the signal processing unit 10-$n$. For example, among the distributed antennas 30, the distributed antenna 30 to which many UEs are connected has a larger load than the distributed antenna 30 to which many UEs are not connected.

Therefore, when M(n) distributed antennas 30 are connected to the signal processing unit 10-*n*, and the load of each distributed antenna 30 is a(n, k) (k=1 to M(n)), x(n)=a(n, 1)+ . . . +a(n, M (n)). Since the total number of the distributed antennas 30 is J, M(1)+ . . . +M(N)=J.

Next, the assignment unit 50 determines whether there is a signal processing unit 10-*n* satisfying Ta(n)≤x(n) (step S103). That is, for n=1 to N, it is determined whether there is a signal processing unit 10-*n* whose load x(n) is equal to or greater than the target value Ta(n) serving as a reference. In step S103, an affirmative determination is made when there is even one signal processing unit 10-*n* satisfying Ta(n)≤x(n). When there is no signal processing unit 10-*n* satisfying Ta(n)≤x(n) (step S103: NO), the process returns to step S102.

When there is a signal processing unit 10-*n* satisfying Ta(n)≤x(n) (step S103: NO), the assignment unit 50 determines whether there is a signal processing unit 10-*n* satisfying Ta(n)>x(n) (step 3104). That is, for n=1 to N, it is determined whether there is a signal processing unit 10-*n* whose load x(n) is less than the target value Ta(n) serving as a reference. In step S104, an affirmative determination is made when there is even one signal processing unit 10-*n* satisfying Ta(n)>x(n). When there is no signal processing unit 10-*n* satisfying Ta(n)>x(n) (step S104: NO), the process returns to step S102.

When there is a signal processing unit 10-*n* satisfying Ta(n)>x(n) (step 3104: YES), the assignment unit 50 acquires a maximum value a(p, q) and a minimum value a(r, s) among a(•, •) of x(n)=a(n, 1)+ . . . +a(n, M(n)) that satisfies Ta(n)≤x(n) (step 3105). That is, the assignment unit 50 acquires the distributed antenna 30 having the largest load and the distributed antenna 30 having the smallest load among the distributed antennas 30 connected to the signal processing unit 10 having a load equal to or greater than the target value.

The assignment unit 50 acquires the minimum value x(t) of x(n) (step S106). x(t) satisfies Ta(t)>x(t). The assignment unit 50 determines whether or not the maximum value satisfies a(p, q)<Ta(t)−x(t) (step S107). Since the right side is the difference between the target value and the load, the right side indicates the load that can be accepted by the signal processing unit 10-*t*. Therefore, when a (p, q)<Ta(t)−x(t) is satisfied, it indicates that the load of the signal processing unit 10-*t* is less than the target value even if the distributed antenna 30 with the load of the maximum value a(p, q) is assigned to the signal processing unit 10-*t*.

In a case of a(p, q)<Ta(t)−x(t) (step S107: YES), the assignment unit 50 causes the switch 20 to shift the assignment destination of the distributed antenna 30 of the load of a(p, q) from the signal processing unit 10-*p* to the signal processing unit 10-*t* (step 3108), and the process returns to step S102. FIG. 3 simply describes this as "shift assignment destination from p to t".

On the other hand, when a(p, q)<Ta(t)−x(t) is not satisfied (step S107: NO), the assignment unit 50 causes the switch 20 to shift the assignment destination of the distributed antenna 30 of the load of a(r, s) from the signal processing unit 10-*r* to the signal processing unit 10-*t* (step S109), and the process returns to step 3102. FIG. 3 simply describes this as "shift assignment destination from r to t".

As illustrated in the flowchart of FIG. 3, the assignment unit 50 assigns the connection destination of the distributed antenna 30 connected to the signal processing unit 10 having the largest load indicated by the load information to the signal processing unit 10 having the smallest load indicated by the load information.

As illustrated in steps S103 and S104, when there is a signal processing unit 10 having a load equal to or greater than the reference value and there is a signal processing unit 10 having a load less than the reference value, the assignment unit 50 assigns the signal processing unit 10 having a load less than the reference value to the connection destination of the distributed antenna 30 connected to the signal processing unit 10 having a load equal to or greater than the reference value.

As illustrated in step 3107, when the load of the signal processing unit 10 is not equal to or greater than the reference value even when the distributed antenna 30 having the largest load among the distributed antennas 30 connected to the signal processing unit 10 having the largest load is connected to the signal processing unit 10 having the smallest load, the assignment unit 50 assigns the connection destination of the distributed antenna 30 having the largest load to the signal processing unit 10 having the smallest load.

As a result, since the distributed antenna 30 is assigned from the signal processing unit 10 with the load equal to or greater than the target value to the signal processing unit 10 with the load less than the target value, the loads can be leveled.

In the flowchart of FIG. 3 described above, although x(•) can be acquired, when a(•, •) of each distributed antenna 30 cannot be acquired, the distributed antenna 30 may be randomly selected from the largest x(•) and assigned to the smallest x(•).

Figure 4:
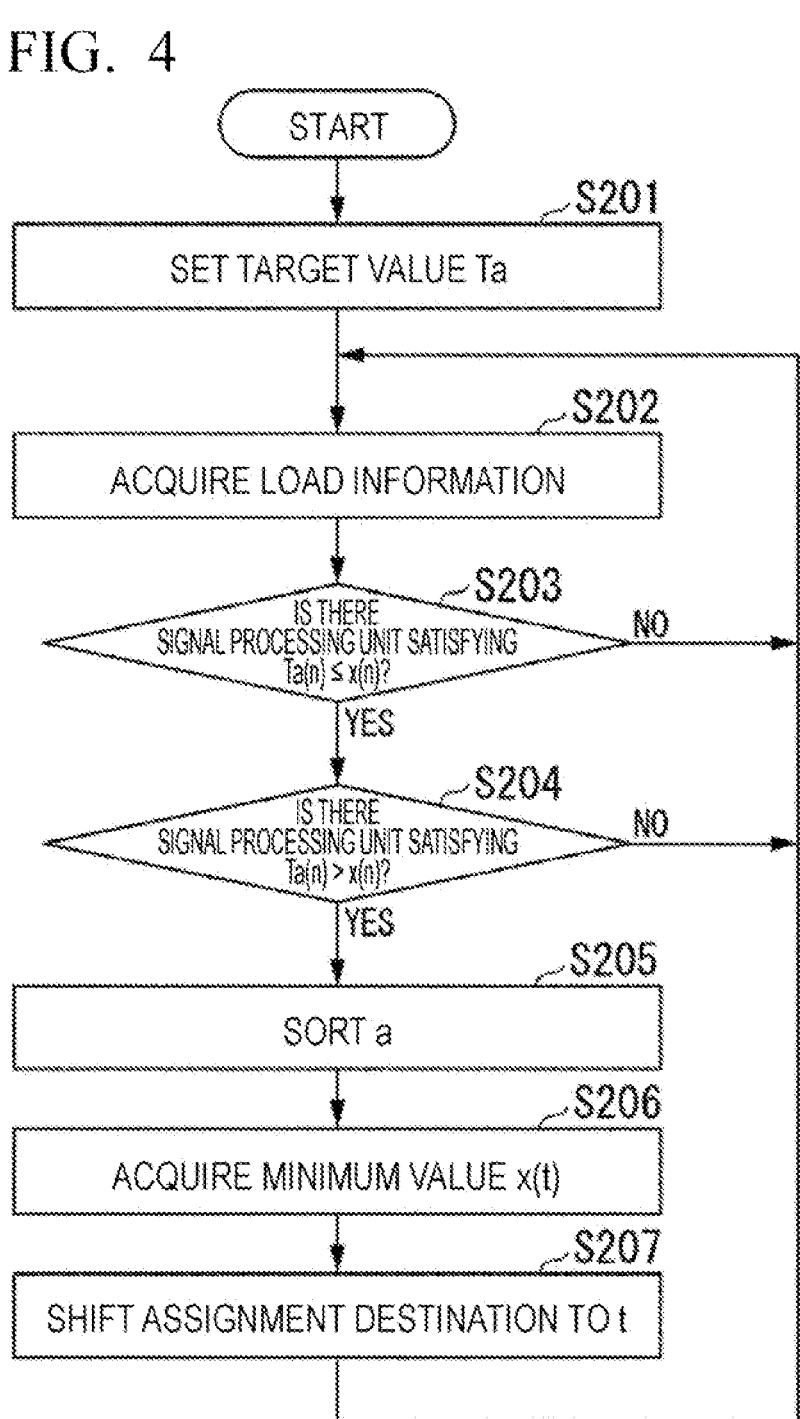
FIG. 4 is a flowchart illustrating a flow of processing of the CS 100.

FIG. 4 is a flowchart illustrating a flow of processing of the CS 100. The flowchart illustrated in FIG. 4 is a second flowchart in a case where a target value is used as a reference. In FIG. 4, the setting unit 60 sets a target value Ta for each signal processing unit 10 (step S201). A target value of a signal processing unit 10-*n* (n=1 to N) is set to Ta(n).

The acquisition unit 40 acquires the above-described load information from each signal processing unit 10 (step S202). The acquired load information is output to the assignment unit 50. The load indicated by the load information acquired from the signal processing unit 10-*n* is x(n). x(n) is a sum of loads in the distributed antenna 30 connected to the signal processing unit 10-*n*.

When M(n) distributed antennas 30 are connected to the signal processing unit 10-*n*, and the load of each distributed antenna 30 is a(n, k) (k=1 to M(n)), x(n)=a(n, 1)+ . . . +a(n, M (n)).

Next, the assignment unit 50 determines whether Ta(n) ≤x(n) is satisfied (step 3203). That is, for n=1 to N, it is determined whether there is a signal processing unit 10-*n* whose load x(n) is equal to or greater than the target value Ta(n) serving as a reference. In step S203, an affirmative determination is made when there is even one signal processing unit 10-*n* satisfying Ta(n)≤x(n). When there is no signal processing unit 10-*n* satisfying Ta(n)≤x(n) (step S203: NO), the process returns to step S202.

When there is a signal processing unit 10-*n* satisfying Ta(n)≤x(n) (step S203: NO), the assignment unit 50 determines whether Ta(n)>x(n) is satisfied (step S204). That is, for n=1 to N, it is determined whether there is a signal processing unit 10-*n* whose load x(n) is less than the target value Ta(n) serving as a reference. In step S204, an affirmative determination is made when there is even one signal processing unit 10-*n* satisfying Ta(n)>x(n). When there is no signal processing unit 10-*n* satisfying Ta(n)>x(n) (step S204: NO), the process returns to step 3202.

When there is a signal processing unit 10 satisfying Ta(n)>x(n) (step S204: YES), the assignment unit 50 sorts a(•, •) (step S205). The assignment unit 50 acquires the minimum value x(t) of x(n) (step S206). x(t) satisfies Ta(t)>x(t). Accordingly, the load of the signal processing unit 10-t is less than the target value.

The assignment unit 50 causes the switch 20 to shift the assignment destination of the distributed antenna 30 with the load of a(•, •) to the signal processing unit 10-t in descending order of the sorted a(•, •) (step S207), and the process returns to step 302. FIG. 4 simply describes this as "shift assignment destination to t".

In step S207 described above, for example, assignment is performed in descending order until immediately before Ta(t)<x(t) is satisfied, and then assignment is similarly performed until immediately before Ta(•)<x(•) at x(•) that is the second smallest after x(t), and this is repeated until there is no signal processing unit 10 satisfying Ta(•)≤x(•). After the assignment destinations are first determined in this manner, the assignment destinations are simultaneously changed using the switch 20.

As a result, since the distributed antenna 30 is assigned from the signal processing unit 10 with the load equal to or greater than the target value to the signal processing unit 10 with the load less than the target value, the loads can be leveled.

Figure 5:
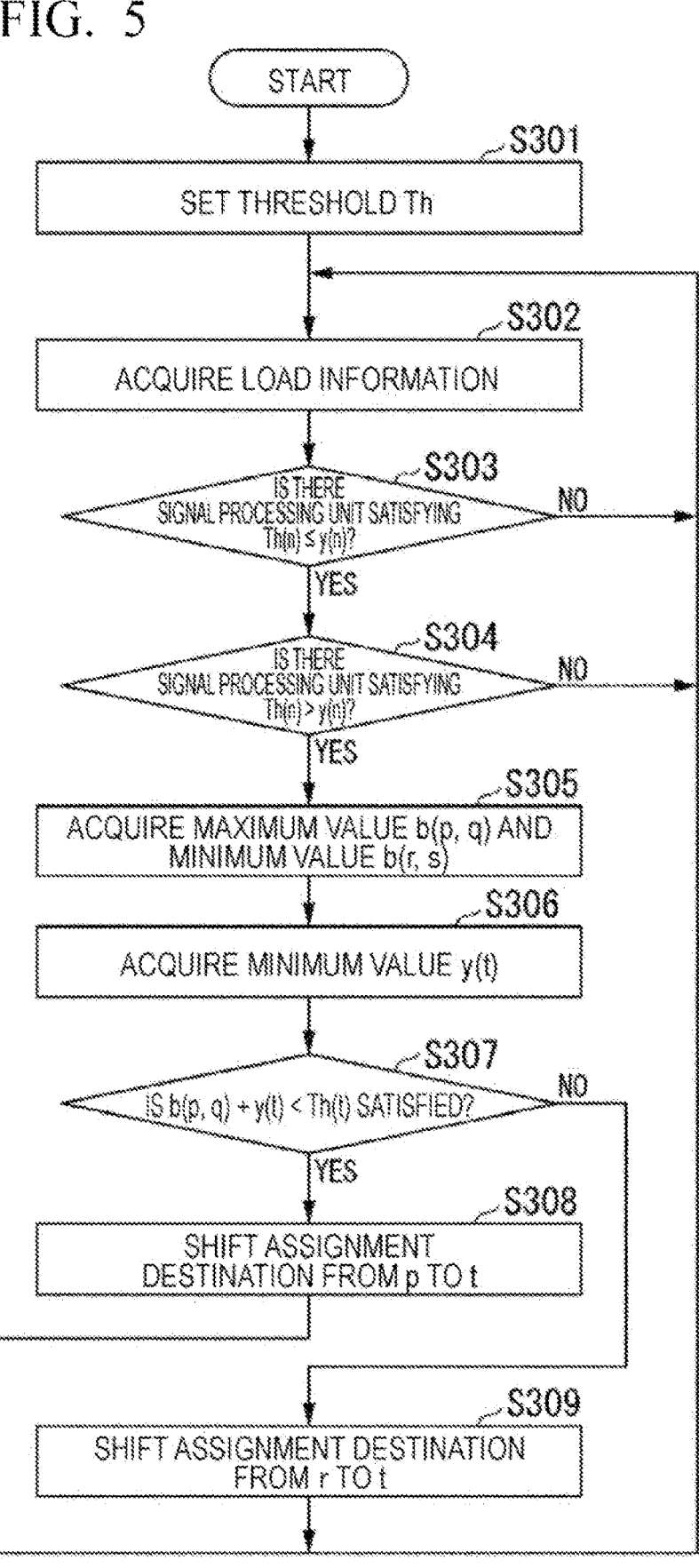
FIG. 5 is a flowchart illustrating a flow of processing of the CS 100.

FIG. 5 is a flowchart illustrating a flow of processing of the CS 100. The flowchart illustrated in FIG. 5 is a first flowchart in a case where a threshold is used as a reference.

In FIG. 5, the setting unit 60 sets a threshold Th for each signal processing unit 10 (step S301). A threshold of the signal processing unit 10-n (n=1 to N) is set as Th(n).

The acquisition unit 40 acquires the above-described load information from each signal processing unit 10 (step S302). The acquired load information is output to the assignment unit 50. The load indicated by the load information acquired from the signal processing unit 10-n is y(n). y(n) is a sum of loads in the distributed antenna 30 connected to the signal processing unit 10-n. For example, among the distributed antennas 30, the distributed antenna 30 to which many UEs are connected has a larger load than the distributed antenna 30 to which many UEs are not connected.

Therefore, when M(n) distributed antennas 30 are connected to the signal processing unit 10-n, and the load of each distributed antenna 30 is b(n, k) (k=1 to M(n)), y(n)=b(n, 1)+ . . . +b(n, M (n)). Since the total number of the distributed antennas 30 is J, M(1)+ . . . +M(N)=J.

Next, the assignment unit 50 determines whether Th(n)≤y(n) is satisfied (step S303). That is, for n=1 to N, it is determined whether there is a signal processing unit 10-n whose load y(n) is equal to or greater than the threshold Th(n) serving as a reference. In step S303, an affirmative determination is made when there is even one signal processing unit 10-n satisfying Th(n)≤y(n). When there is no signal processing unit 10-n satisfying Th(n)≤y(n) (step S303: NO), the process returns to step S302.

When there is a signal processing unit 10-n satisfying Th(n)≤y(n) (step S303: YES), the assignment unit 50 determines whether Th(n)>y(n) is satisfied (step S304). That is, for n=1 to N, it is determined whether there is a signal processing unit 10-n whose load y(n) is less than the threshold Th(n) serving as a reference. In step S304, an affirmative determination is made when there is even one signal processing unit 10-n satisfying Th(n)>y(n). When there is no signal processing unit 10-n satisfying Th(n)>y(n) (step S304: NO), the process returns to step S302.

When there is a signal processing unit 10-n satisfying Th(n)>y(n) (step S304: YES), the assignment unit 50 acquires a maximum value b(p, q) and a minimum value b(r, s) among b(•, •) of y(n)=b(n, 1)+ . . . +b(n, M(n)) that satisfies Th(n)≤y(n) (step S305). That is, the assignment unit 50 acquires the distributed antenna 30 having the largest load and the distributed antenna 30 having the smallest load among the distributed antennas 30 connected to the signal processing unit 10 having a load equal to or greater than the threshold.

The assignment unit 50 acquires the minimum value y(t) of y(n) (step S306). y(t) satisfies Th(t)>y(t). The assignment unit 50 determines whether or not the maximum value satisfies b(p, q)+y(t)<Th(t) (step 3307). That is, the assignment unit 50 determines whether the value is less than the threshold even if the current load is added to the maximum value. Therefore, when b(p, q)+y(t)<Th(t) is satisfied, it indicates that the load of the signal processing unit 10-t is less than the threshold even if the distributed antenna 30 with the load of the maximum value b(p, q) is assigned to the signal processing unit 10-t.

In a case of b(p, q)+y(t)<Th(t) (step S307: YES), the assignment unit 50 causes the switch 20 to shift the assignment destination of the distributed antenna 30 of the load of b(p, q) from the signal processing unit 10-p to the signal processing unit 10-t (step S308), and the process returns to step S302. FIG. 5 simply describes this as "shift assignment destination from p to t".

On the other hand, when b(p, q)<Th(t)−y(t) is not satisfied (step S307: NO), the assignment unit 50 causes the switch 20 to shift the assignment destination of the distributed antenna 30 of the load of b(r, s) from the signal processing unit 10-r to the signal processing unit 10-t (step S309), and the process returns to step S302. FIG. 5 simply describes this as "shift assignment destination from r to t".

As illustrated in the flowchart of FIG. 5, the assignment unit 50 assigns the connection destination of the distributed antenna 30 connected to the signal processing unit 10 having the largest load indicated by the load information to the signal processing unit 10 having the smallest load indicated by the load information.

As illustrated in steps S303 and S304, when there is a signal processing unit 10 having a load equal to or greater than the reference value and there is a signal processing unit 10 having a load less than the reference value, the assignment unit 50 assigns the signal processing unit 10 having a load less than the reference value to the connection destination of the distributed antenna 30 connected to the signal processing unit 10 having a load equal to or greater than the reference value.

As illustrated in step S307, when the load of the signal processing unit 10 is not equal to or greater than the reference value even when the distributed antenna 30 having the largest load among the distributed antennas 30 connected to the signal processing unit 10 having the largest load is connected to the signal processing unit 10 having the smallest load, the assignment unit 50 assigns the connection destination of the distributed antenna 30 having the largest load to the signal processing unit 10 having the smallest load.

As a result, since the distributed antenna 30 is assigned from the signal processing unit 10 with the load equal to or greater than the threshold to the signal processing unit 10 with the load less than the threshold, the loads can be leveled.

In the flowchart of FIG. 5 described above, although y(•) can be acquired, when a(•, •) of each distributed antenna 30 cannot be acquired, the distributed antenna 30 may be randomly selected from the largest y(•) and assigned to the smallest y(•).

FIG. 6 is a flowchart illustrating a flow of processing of the CS 100. The flowchart illustrated in FIG. 6 is a second flowchart in a case where a threshold is used as a reference. In FIG. 6, the setting unit 60 sets a threshold Th for each signal processing unit 10 (step S401). A threshold of the signal processing unit 10-*n* (n=1 to N) is set as Th(n).

The acquisition unit 40 acquires the above-described load information from each signal processing unit 10 (step S402). The acquired load information is output to the assignment unit 50. The load indicated by the load information acquired from the signal processing unit 10-*n* is y(n). y(n) is a sum of loads in the distributed antenna 30 connected to the signal processing unit 10-*n*.

When M(n) distributed antennas 30 are connected to the signal processing unit 10-*n*, and the load of each distributed antenna 30 is b(n, k) (k=1 to M(n)), y(n)=b(n, 1)+ . . . +b(n, M (n)).

Next, the assignment unit 50 determines whether Th(n)≤y(n) is satisfied (step S403). That is, for n=1 to N, it is determined whether there is a signal processing unit 10-*n* whose load y(n) is equal to or greater than the threshold Th(n) serving as a reference. In step S403, an affirmative determination is made when there is even one signal processing unit 10-*n* satisfying Th(n)≤y(n). When there is no signal processing unit 10-*n* satisfying Th(n)≤y(n) (step S403: NO), the process returns to step S402.

When there is a signal processing unit 10-*n* satisfying Th(n)≤y(n) (step S403: YES), the assignment unit 50 determines whether Th(n)>y(n) is satisfied (step S404). That is, for n=1 to N, it is determined whether there is a signal processing unit 10-*n* whose load y(n) is less than the threshold Th(n) serving as a reference. In step S404, an affirmative determination is made when there is even one signal processing unit 10-*n* satisfying Th(n)>y(n). When there is no signal processing unit 10-*n* satisfying Th(n)>y(n) (step S404: NO), the process returns to step S402.

When there is a signal processing unit 10 satisfying Th(n)>y(n) (step S404: YES), the assignment unit 50 sorts b(•, •) (step S405). The assignment unit 50 acquires the minimum value y(t) of y(n) (step S406). y(t) satisfies Th(t)>y(t). Accordingly, the load of the signal processing unit 10-*t* is less than the threshold.

The assignment unit 50 causes the switch 20 to shift the assignment destination of the distributed antenna 30 with the load of b(•, •) to the signal processing unit 10-*t* in descending order of the sorted b(•, •) (step S407), and the process returns to step S102. FIG. 6 simply describes this as "shift assignment destination to t".

In step S407 described above, for example, assignment is performed in descending order until immediately before Th(t)<y(t) is satisfied, and then assignment is similarly performed until immediately before Th(•)<y(•) at y(•) that is the second smallest after y(t), and this is repeated until there is no signal processing unit 10 satisfying Th(•)≤y(•). After the assignment destinations are first determined in this manner, the assignment destinations are simultaneously changed using the switch 20.

As a result, since the distributed antenna 30 is assigned from the signal processing unit 10 with the load equal to or greater than the threshold to the signal processing unit 10 with the load less than the threshold, the loads can be leveled.

In the flowcharts of FIGS. 3 to 6 described above, leveling is performed according to the comparison result with the target value or the threshold. On the other hand, leveling may be performed when a predetermined trigger arrives without comparison with the target value or the threshold.

Examples of the predetermined trigger include an instruction by an operator of the wireless communication system 1 and a periodic timing. In addition, examples of the trigger include a time when the variation in the load of the signal processing unit 10 becomes large (a time when the variance becomes a predetermined value or more).

As an assignment method in this case, in order to reduce the number of changes of the connection destination of the distributed antenna 30 as much as possible, an appropriate distributed antenna 30 having the minimum number of changes in leveling based on the value of a (•, •) or b (•, •) described above may be selected, and the selected distributed antenna 30 may be set as a shift target. As another assignment method, leveling may be performed on the basis of the value of a(•, •) or b(•, •) such that each x(n)/Ta(n) or each y(n)/Th(n) of n=1 to N has substantially the same value.

The load of the distributed antenna 30 varies depending on the day of the week and the time zone. Therefore, a statistic indicating the load of the distributed antenna 30 may be obtained in advance for each day of the week and each time zone, and the connection destination of the distributed antenna 30 may be assigned on the basis of the statistic. For example, when a statistic indicating that the number of UEs connected to the predetermined distributed antenna 30 increases is obtained around daytime on Sunday, the assignment may be performed such that the connection destination of the predetermined distributed antenna 30 is a different signal processing unit 10 in response to arrival of the daytime on Sunday.

In the embodiment described above, the switch 20 is provided outside the CS 100, but may be provided inside the CS 100. In the wireless communication system 1 according to the embodiment, the analog RoF technology is used as a communication method between the distributed antenna 30 and the signal processing unit 10, but a digital RoF technology may be used instead of the analog RoF technology. This is because the processing of leveling the loads of the plurality of signal processing units does not depend on the communication method between the distributed antenna 30 and the signal processing unit 10.

(Modification)

Figure 7:
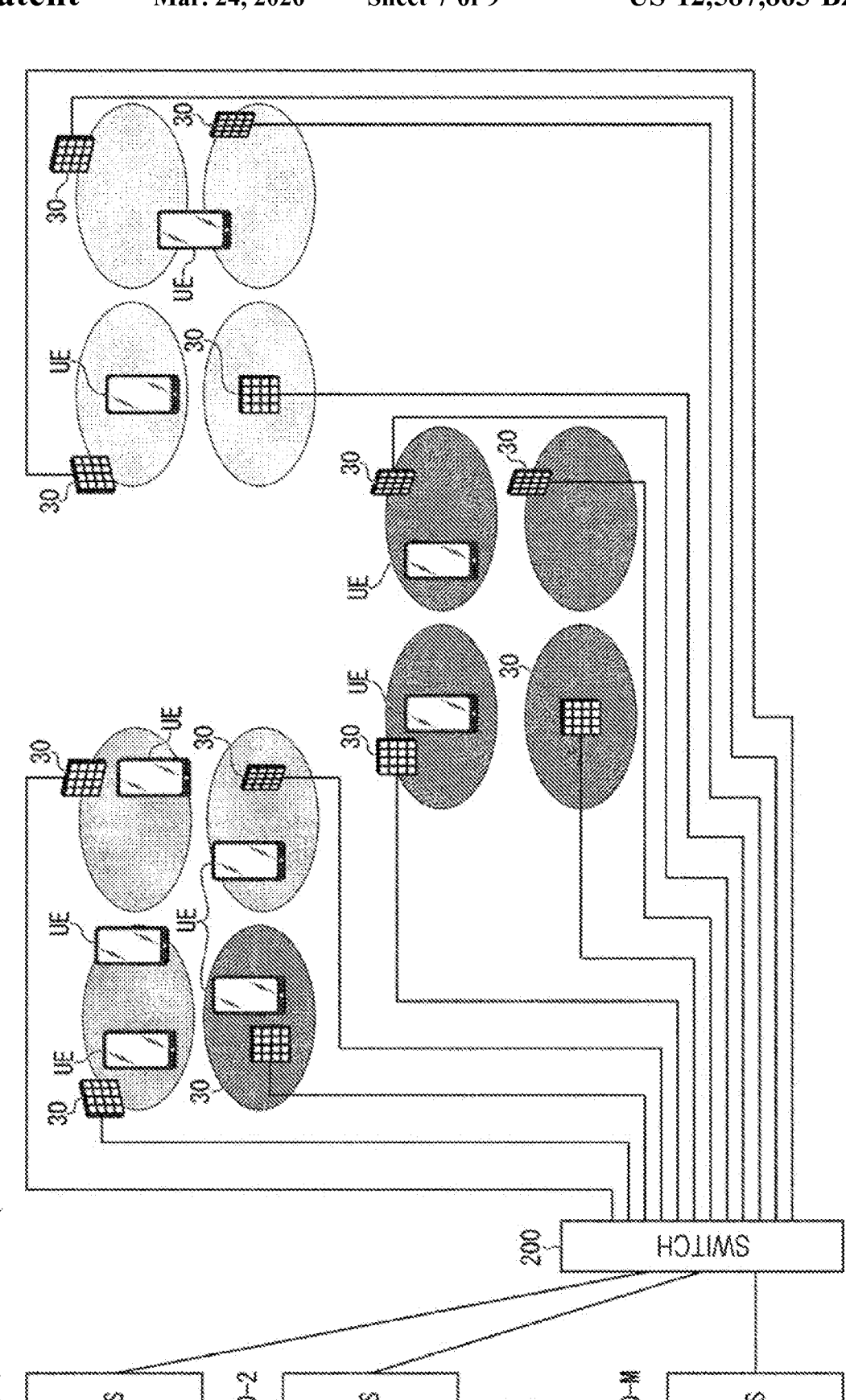
FIG. 7 is a diagram illustrating a modification of the wireless communication system.
Figure 8:
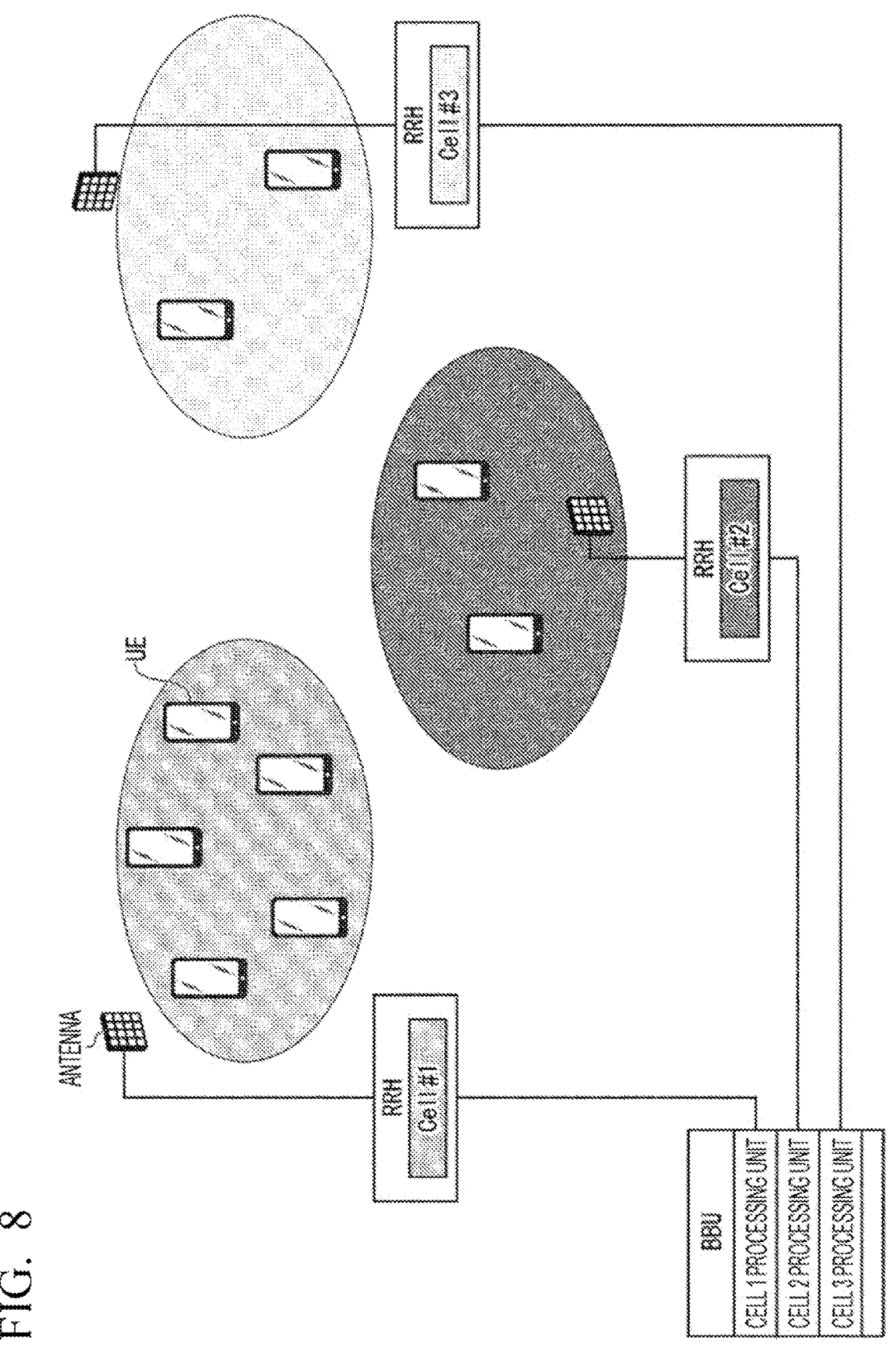
FIG. 8 is a diagram illustrating a configuration of a conventional technology.
Figure 9:
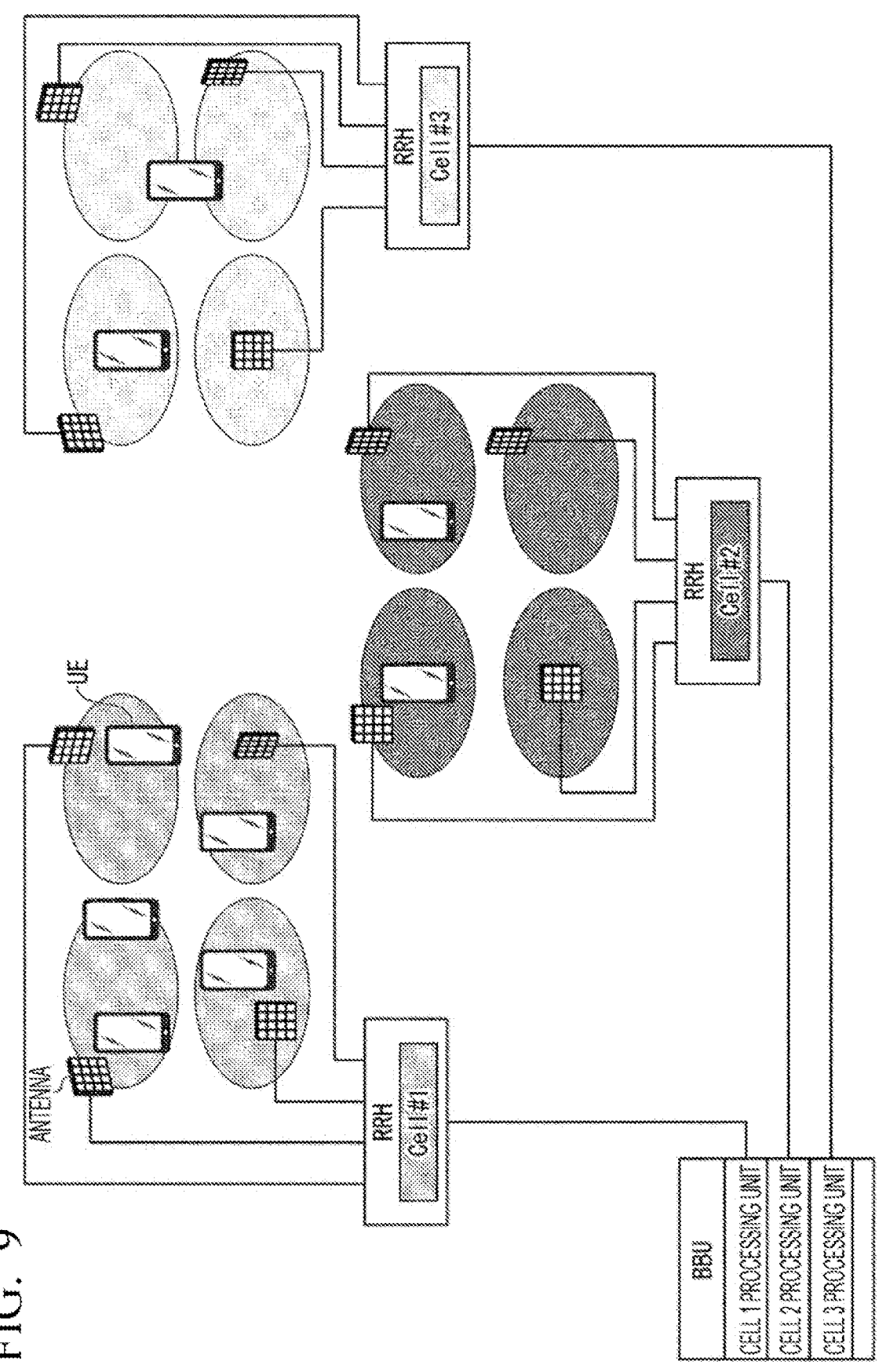
FIG. 9 is a diagram illustrating a configuration of a conventional technology.

In the wireless communication system 1, the CS 100 is connected to the distributed antenna 30 via the switch 20, but may have a configuration using a plurality of CSs and switches. FIG. 7 illustrates a configuration example of a wireless communication system 1000 using a plurality of CSs and switches. The wireless communication system 1000 includes a plurality of (M: M is an integer of 2 or more) CSs 100-1, 100-2, . . . , and 100-M.

The CSs 100-1, 100-2, . . . , 100-M are connected to the distributed antenna 30 via the switch 200. In the wireless communication system 1000, the CSs 100-1, 100-2, . . . , 100-M and the switch 200 are connected by one signal line, but this is an example, and may be connected by a plurality of signal lines.

In the wireless communication system 1000, each of the CSs 100-1, 100-2, . . . , and 100-M includes one or more signal processing units, but the switch 200 may have functions corresponding to the acquisition unit, the assignment unit, and the setting unit without including the acquisition unit, the assignment unit, and the setting unit described in FIG. 2. Alternatively, an operation system (OPS) of a higher order than the CSs 100-1, 100-2, . . . , 100-M may be provided, and functions corresponding to the acquisition unit, the assignment unit, and the setting unit may be implemented by the OPS. Alternatively, the functions corresponding to the acquisition unit, the assignment unit, and the setting unit may be achieved by exchanging the load information and the assignment information between the CSs 100-1, 100-2, . . . , 100-M. In the wireless communication system 1000, in a case where the CSs 100-1, 100-2, . . . , 100-M have an acquisition unit, an assignment unit, and a setting unit, the CSs may function as the acquisition unit, the assignment unit, and the setting unit to be assigned to the signal processing units included in the CSs themselves.

As described above, when the present embodiment is applied to a plurality of CSs, not only the distribution of the load information but also the redundancy at the time of failure of the CS can be secured.

The acquisition unit 40, the assignment unit 50, and the setting unit 60 include a processor such as a central processing unit (CPU) and a memory. In this case, the acquisition unit 40, the assignment unit 50, and the setting unit 60 function as the acquisition unit 40, the assignment unit 50, and the setting unit 60 by the processor executing a program. All or some of the functions of the acquisition unit 40, the assignment unit 50, and the setting unit 60 may be realized by using hardware such as an application specific integrated circuit (ASIC), a programmable logic device (PLD), or a field programmable gate array (FPGA). The program may be recorded in a computer-readable recording medium. Examples of the computer-readable recording medium include a portable medium such as a flexible disk, a magneto-optical disk, a ROM, a CD-ROM, and a semiconductor storage device (for example, a solid state drive (SSD)), and a storage device such as a hard disk and a semiconductor storage device incorporated in a computer system. The program may be transmitted via a telecommunication line.

While the embodiments of this invention have been described in detail with reference to the drawings, specific configurations are not limited to these embodiments, and include designs and the like without departing from the spirit of this invention.

INDUSTRIAL APPLICABILITY

The present invention is applicable to a wireless communication system having a relatively large load fluctuation such as a large change in the number of user terminals connected.

REFERENCE SIGNS LIST

1 Wireless communication system
10 Signal processing unit
20 Switch
30 Distributed antenna
40 Acquisition unit
50 Assignment unit
60 Setting unit
100 CS

The invention claimed is:

1. A control method in a wireless communication system including a plurality of distributed antennas that perform wireless communication with a user terminal, and a plurality of signal processing units that are connected to the plurality of distributed antennas and perform signal processing, the control method comprising:

setting reference information for leveling loads of the plurality of signal processing units for each of the plurality of signal processing units;

acquiring load information indicating a load of a signal processing unit; and

assigning the signal processing unit as a connection destination of the distributed antenna on the basis of the load information acquired in the acquiring and the reference information set in the setting, and leveling the loads of the plurality of signal processing units.

2. The control method according to claim 1, wherein, in the assigning, the signal processing unit as the connection destination of the distributed antenna is assigned by using a switch that switches the connection destination of the distributed antenna.

3. The control method according to claim 1, wherein, in the assigning, the connection destination of the distributed antenna connected to the signal processing unit having a largest load indicated by the load information is assigned to the signal processing unit having a smallest load indicated by the load information.

4. The control method according to claim 3, wherein the reference information indicates a reference value for comparison with the load indicated by the load information, and, in the assigning, when there is the signal processing unit whose load indicated by the load information is equal to or greater than the reference value and there is the signal processing unit whose load indicated by the load information is less than the reference value, the connection destination of the distributed antenna connected to the signal processing unit whose load indicated by the load information is equal to or greater than the reference value is assigned to the signal processing unit whose load indicated by the load information is less than the reference value.

5. The control method according to claim 4, wherein, in the assigning, when the load of the signal processing unit having the smallest load indicated by the load information is not equal to or greater than the reference value even if the distributed antenna having a largest load indicated by the load information among a plurality of distributed antennas connected to the signal processing unit having the largest load indicated by the load information is connected to the signal processing unit having the smallest load indicated by the load information, the connection destination of the distributed antenna having the largest load indicated by the load information is assigned to the signal processing unit having the smallest load indicated by the load information.

6. The control method according to claim 1, wherein the load information indicates a number of connected user terminals that perform wireless communication with the distributed antenna, a user throughput in a user terminal that performs wireless communication with the distributed antenna, a number of traffic buffers in the signal processing unit, or a calling failure rate in the signal processing unit.

7. The control method according to claim 1, wherein, in the assigning, the signal processing unit as the connection destination of the distributed antenna is assigned based on a statistic indicating the load of the distributed antenna.

8. A wireless communication system comprising a plurality of distributed antennas that perform wireless communication with a user terminal, and a plurality of signal processing units that are connected to the plurality of distributed antennas and perform signal processing, the wireless communication system further comprising:

a setter that sets reference information for leveling loads of the plurality of signal processing units for each of the plurality of signal processing units;

an acquirer that acquires load information indicating a load of a signal processing unit; and an assignor that assigns the signal processing unit as a connection destination of the distributed antenna on the basis of the load information acquired by the acquirer and the reference information set by the setter, and leveling the loads of the plurality of signal processing units.

\* \* \* \* \*